United States Patent [19]

Polach et al.

[11] Patent Number: 4,690,374
[45] Date of Patent: Sep. 1, 1987

[54] MAGNETIC VALVE FOR FLUID CONTROL

[75] Inventors: Wilhelm Polach, Möglingen; Helmut Rembold, Stuttgart, both of Fed. Rep. of Germany

[73] Assignee: Robert Bosch GmbH, Stuttgart, Fed. Rep. of Germany

[21] Appl. No.: 801,710

[22] Filed: Nov. 26, 1985

[30] Foreign Application Priority Data

Jan. 9, 1985 [DE] Fed. Rep. of Germany ....... 3500449

[51] Int. Cl.[4] ............................................ F16K 31/06
[52] U.S. Cl. ......................... 251/129.02; 251/129.16; 239/585
[58] Field of Search ............... 251/50, 129.16, 129.02; 239/585

[56] References Cited

U.S. PATENT DOCUMENTS

| 2,217,141 | 10/1940 | Sprenkle | 251/50 X |
| 2,980,139 | 4/1961 | Lynn | 251/50 X |
| 4,475,690 | 10/1984 | Hascher-Reichl et al. | |
| 4,512,549 | 4/1985 | Gast et al. | |

FOREIGN PATENT DOCUMENTS

| 410888 | 6/1945 | Italy | 251/50 |
| 0046176 | 4/1981 | Japan | 251/129.02 |

Primary Examiner—Arnold Rosenthal
Attorney, Agent, or Firm—Edwin E. Greigg

[57] ABSTRACT

A magnetic valve used for fluid control includes a valve housing, having a magnetic coil surrounding a core, and an armature, which is joined to a valve closing element which cooperates with a fixed valve seat. An end on which a collar is embodied, the valve closing element protrudes into an interior of a spring housing, which is slidably disposed counter to the force of a counter-spring. A first bent end of an angle element is supported on a cover of the spring housing, while a second bent end grips the collar from behind and protrudes through a bottom opening of the spring housing. In the open position of the valve closing element, the second bent end is spaced apart from the collar by a distance a. In the valve closing element there is a compensation bore leading to the interior of the spring housing. After actuation of the magnetic coil, the armature displaces the valve closing element toward the valve seat counter to the force of the restoring spring. Only with a delay does a fluid pressure build up in the interior which displaces the spring housing toward the housing stop, thereby stressing a supplementary spring. When the magnetic coil excitation is interrupted, the forces of the restoring spring and of the supplementary spring act in common in the opening direction of the valve closing element, thereby effecting a rapid opening.

9 Claims, 4 Drawing Figures

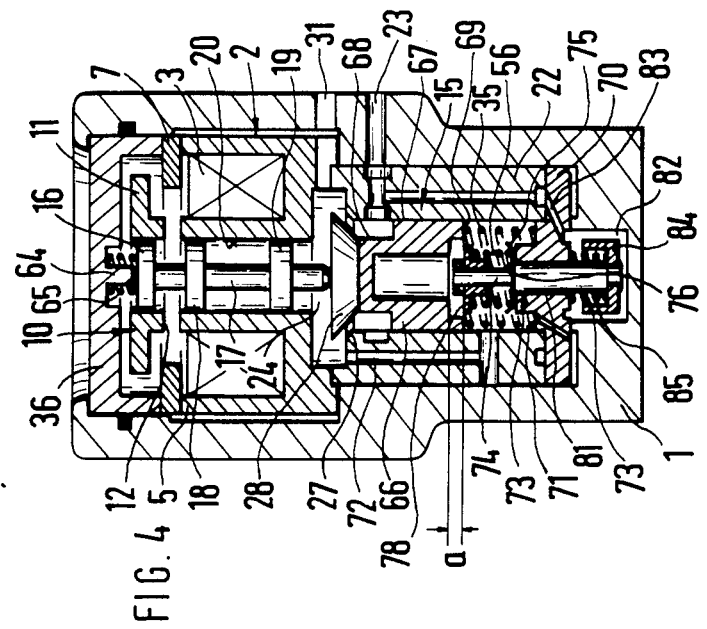

MAGNETIC VALVE FOR FLUID CONTROL

BACKGROUND OF THE INVENTION

The invention is based on a magnetic valve for fluid control as generally defined hereinafter. A magnetic valve is already known which is used in fuel injection in Diesel engines up to a pressure range of approximately 300 bar. In direct injection in Diesel engines, however, fuel pressures of 700 to 1200 bar are required; if the known valve were used, this would necessitate moving large masses, so that the magnetic valve switching times would become undesirably long.

OBJECT AND SUMMARY OF THE INVENTION

The magnetic valve according to the invention has the advantage over the prior art of necessitating the movement of the smallest possible masses, so that fast magnetic valve switching times are attainable even at such high fluid pressures of 700 to 1200 bar.

The invention will be better understood and further objects and advantages thereof will become more apparent from the ensuing detailed description of preferred embodiments taken in conjunction with the drawings.

BRIEF DESCRIPTION OF THE DRAWINGS

FIG. 3 shows a third exemplary embodiment of a magnetic valve according to the invention; and FIG. 4 shows a fourth exemplary embodiment of a magnetic valve according to the invention.

DESCRIPTION OF THE PREFERRED EMBODIMENTS

Figure 1:
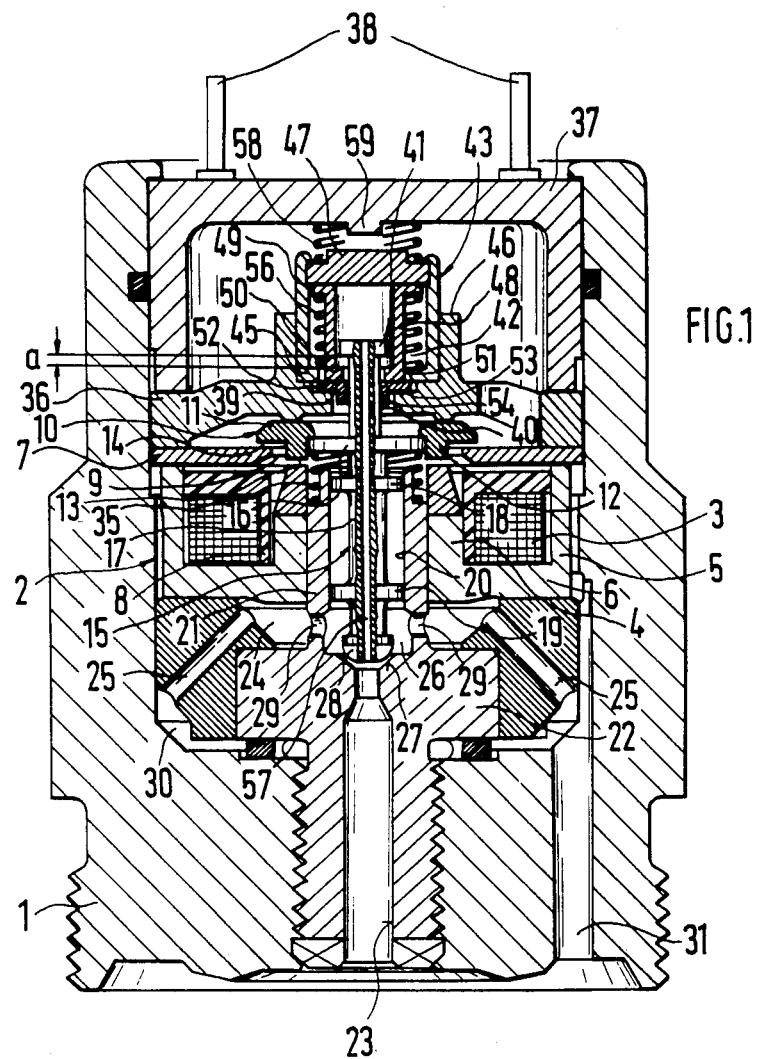
FIG. 1 shows a first exemplary embodiment of a magnetic valve according to the invention.

The magnetic valve shown in FIG. 1 has a valve housing 1. Inside the valve housing 1, a core 2 of ferromagnetic material is provided, bearing a magnetic coil 3. The core 2 has an inner cylinder portion 4 and an outer cylinder portion 5, which are arranged concentrically with respect to one another and surround the magnetic coil 3. The inner cylinder portion 4 and the outer cylinder portion 5 are joined together in a magnetic conductive manner by a yoke portion 6. Remote from the yoke portion 6, a separate magnetically conductive, circular-annular plate 7 protrudes from the outer cylinder portion 5 toward the inner cylinder portion 4. The magnetic coil 3 is supported by a coil body 8. The magnetic circuit that is interrupted between the inner cylinder portion 4 and the circular-annular plate 7 is bridged by an armature 10. The armature 10 has a plate-like portion 11, which merges with an annular dependent stem 12. The stem 12 faces the end face of the inner cylinder portion 4 and, pointing toward the inner cylinder portion, extends engagingly through an opening 9 in the plate 7. A first air gap 13 is located between the stem 12 and the inner cylinder portion 4. Remote from the inner cylinder portion 4, the plate-like portion 11 of the armature protrudes outward beyond the plate 7 and with plate 7 forms a second air gap 14. A valve closing element 15 of non-magnetic material, which has a disk-shaped armature head 16 and a stem 17, is pressed with the armature head 16 into the disk-like portion 11 of the armature 10. Two guide sections 18, 19 guide the valve closing element 15 in a cylinder bore 20 of a guide bushing 21. The guide bushing 21 is an extended part of a valve seat body 22, which has an inlet bore 23 in an extension of the cylinder bore 20 of the guide bushing 21. A hollow chamber 24, from which outlet bores 25 extend outward, is enclosed between the yoke portion 6 and the valve seat body 22. Between the inlet bore 23 and an annular chamber 26 in the valve seat body 22, a valve seat 27 is formed, with which a ball-shaped closing body 28 of the valve closing element 15 coopertes. Connecting bores 29 in the guide bushing 21 connect the hollow chamber 24 and the annular chamber 26. The outlet bores 25 lead via intermediate chambers 30 to a return line 31. The inlet bore 23 is supplied with fluid at high pressure, for instance from the pump feed chamber of a fuel feed pump for internal combustion engine fuel injection systems. When the valve is open the fluid pressure does not build up in inlet line 23 because the fluid is able to pass from the valve seat via connecting bores 29 to the hollow chamber 24 and out through the outlet bores to the return line 31, thus the fluid pressure in the chamber 24 and the fluid pressure in the return line 31 is low. The return line 31 communicates for instance with the intake side of the pump tappet of the fuel feed pump. Supported on the guide bushing 21 is a restoring spring 35, the other end of which engages the armature head 16 of the valve closing element 15 and which when the magnetic coil 3 is in the non-excited state raises the valve closing element 15 from the valve seat 27 and keeps the magnetic valve in the open position. A stop plate 36 is disposed in the valve housing 1 above the armature 10 and plate 7.

The cup-shaped housing 1, in which the valve seat body 22, the core 2, the plate 7 and the stop plate 36 are disposed, also receives a cover plate 37, which at one end rests on the stop plate 36 and on the other engages a crimped-over edge of the valve housing 1 which fastens the elements 22, 2, 7, 36, 37 in place in the valve housing 1. Electric current is supplied to the magnetic coil via electrically conductive connection prongs 38, which are disposed in the cover plate 37.

A through bore 39 is provided in the stop plate 36, the end 40 of the valve closing element 15 that adjoins the armature head 16 and is remote from the valve seat 27 passes all the way through this through bore 39 and with a collar 41 protrudes into an interior 42 of a spring housing 43. The spring housing 43 can rest with its bottom 45 on the face of the stop plate 36 that is remote from the armature 10, and with its axial circumference the spring housing 43 is slidably supported, with little play, in a guide extension 46 of the stop plate 36. Remote from the bottom 45, the spring housing 43 is closed by a cover 47. An angle element 48 is disposed in the interior 42 of the spring housing 43; its first bent end 49 extends radially outward and rests on the stop lid 47, and its second bent end 50, embodied on the opposite end and extending radially inward and adapted to grip the collar 41 from behind, passes through a bottom opening 51 of the bottom 45 and then comes to rest on a sealing plate 52 that in turn rests sealingly on a step 53 of the stepped area provided in through bore 39 of the stop plate 36. The sealing plate 52 has radial play within the stepped through bore 39, and in the axial direction it is not pressed by the bottom 45 of the spring housing 43 against the step 53. The end 40 of the valve closing element 15 protrudes through a sealing bore 54 of the sealing plate 52 with little play. Between the angle element 48 and the wall of the spring housing 43, there is a supplementary spring 56, which is supported on one end on the first bent end 49 of the angle element 48 and on the other end on the bottom 45 of the spring housing 43. In the open position of the valve closing element 15, there is an axial distance a between the collar 41 and the second bent end 50 of the angle element 48. From the end of the closing body 28 facing the valve seat 27, a compensation bore 57 extends in the interior of the valve closing element 15 to the end 40 and opens into the interior 42 of the spring housing 43. A pressure equilibrium accordingly prevails at the valve closing element 15.

If the magnetic coil 3 is excited, then the armature 10 is drawn toward the core 2 and presses the closing body 28 of the valve closing element 15 onto the valve seat 27, counter to the force of the restoring spring 35 and counter to the force of the pressure of the fluid in the inlet bore 23. When the valve closing element 15 is seated on the valve seat, the fluid passage to the outlet line 31 via connecting bores 29 and the hollow chamber is blocked, therefore the fluid pressure in inlet 23 is at the pressure of the pump which is greater than if the valve closure element were not seated. The fluid pressure in inlet 23 passes directly to the interior of the pressure equalizing means via a passage 57. At the same time, because of the rising pressure in the interior 42 of the spring housing 43, the spring housing is moved away from the stop plate 36, so that the second bent end 50 of the angle elment 48 comes to rest on the lower side of collar 41 of the valve closing element 15, and upon further displacement of the spring housing 43 due to the fluid in chamber 42, the first bent end 49 is no longer capable of following the cover 47 since it is restrained by the collar 41, thereby tensing the supplementary spring 56 since the spring 56 seats on bottom 45. The movement of the spring housing 43 is effected counter to the force of a counterspring 58, which is supported on one end on the cover plate 37 and on the other on the ocver 47 and is limited by a housing stop 59 embodied on the cover plate 37. The closing movement of the valve closing element 15 is thus effected, when the magnetic coil 3 is excited, only counter to the force of the restoring spring 35, while the force of the supplementary spring 56 increases only with some delay in the direction of an open position of the valve closing element. If the excitation of the magnetic coil 3 is then interrupted, the forces of the restoring spring 35 and of the supplementary spring 56 then act in common upon the valve closing element 15 in the opening direction, and the valve closing element 15 rises very quickly from the valve seat 27, as desired.

Figure 2:
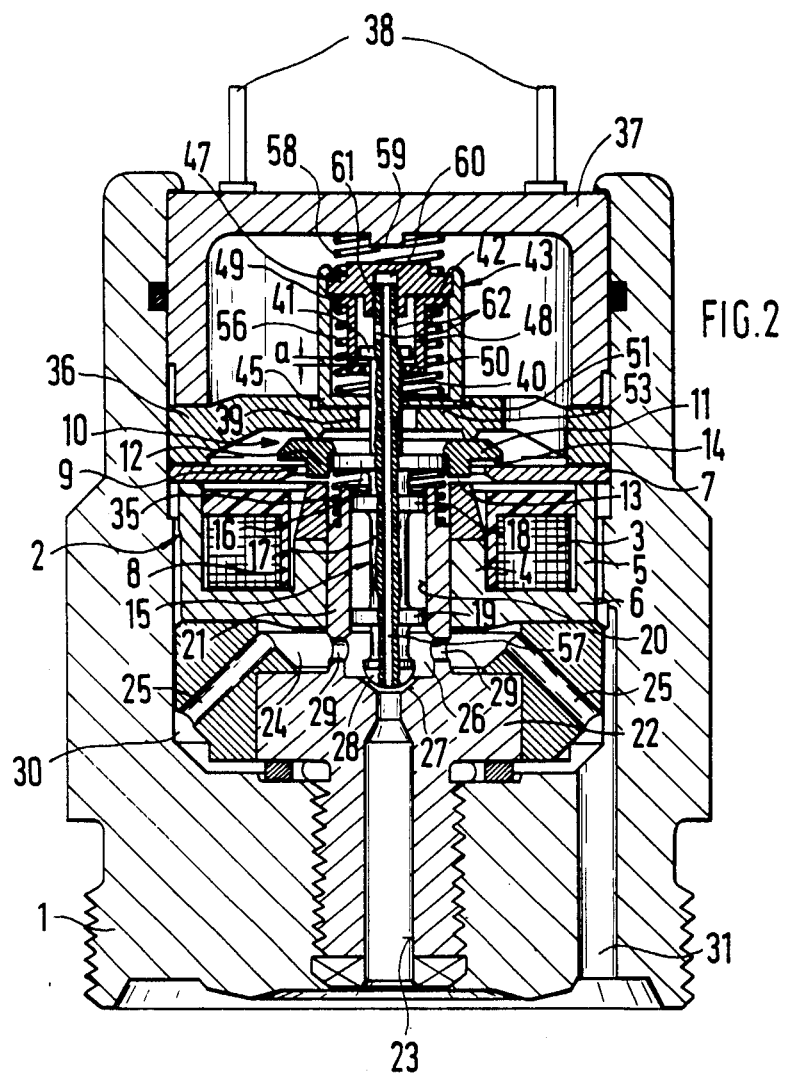
FIG. 2 shows a second exemplary embodiment of a magnetic valve according to the invention.

In the second exemplary embodiment of a magnetic valve shown in FIG. 2, elements identical to and functioning like those of FIG. 1 are identified by the same reference numerals. In a deviation from the exemplary embodiment of FIG. 1, the spring housing 43 of the exemplary embodiment of FIG. 2 is embodied with a bottom 45 housing bottom opening 51 which tightly surrounds the end 40 of the valve closing element 15, but with a sliding engagement. In the exemplary embodiment of FIG. 2, the second bent end 50 of the angle element 48 terminates between the collar 41 and the bottom 45. A guide bore 60 which is open toward the interior 42 is formed in the cover 47, and a guide end 61 of the valve closing element 15 protrudes into this guide bore 60, in which element 15 is slidably supported. The guide end 61 extends from and is joined with the collar 41 and has a smaller diameter than the end 40 in the vicinity of the bottom opening 51. Transverse openings 62 extend into the guide end 61 from the compensation bore 57 to the interior 42 of the spring housing 43. In contrast to the exemplary embodiment of FIG. 1, in the exemplary embodiment of FIG. 2 the spring housing 43 is radially guided not at its circumference but rather at the end 40 and the guide end 61 of the valve closing element 15 via the bottom opening 51 and the guide bore 60. In the same manner as in the exemplary embodiment of FIG. 1, if the magnetic coil 3 is excited then initially the closing body 28 is pressed against the valve seat 27 only counter to the force of the restoring spring 35, while the force of the supplementary spring 56 engages the collar 41 only in a delayed manner, via the angle element 48, by displacing the spring housing 43 toward the housing stop 59. If the excitation of the magnetic coil 3 is interrupted, then the forces of the restoring spring 35 and the supplementary spring 56 together urge the valve closing element 15 in the opening direction.

In the exemplary embodiment of a magnetic valve shown in FIG. 3, elements remaining the same as and having the same function as those of the foregoing embodiments are again identified by the same reference numeral. In the exemplary embodiment of FIG. 3, the stem 17 is still joined via the armature head 16 to the armature 10, but not to the closing body 28 of the valve closing element 15. The stem 17 is guided by guide sections 18 and 19 in the cylinder bore 20 of the core 2, which surrounds the magnetic coil 3. The plate 7 closes the electromagnetic circuit with the plate-like portion 11 of the armature 10, which points with its stem 12 toward the inner cylinder 4 of the core 2. The stop plate 36 closes the valve at the top and limits the movement of the armature 10 by means of a central stop 64. A compression spring 65 surrounds stop 64 and is disposed between the armature head 16 and the stop plate 36 and tends to press the stem 17 against the closing body 28.

The valve closing element 15 is formed by the frustoconical closing body 28 and a bearing section 66, which is slidably supported in a bearing bore 67 of the valve seat body 22. The inlet bore 23 discharges into an annular groove of the bearing section 66, which begins directly at the closing body 28, the largest diameter of which is larger than the diameter of the bearing bore 67. If the magnetic coil 3 is not excited, the restoring spring 35, which is supported at one end on the end face 69 of the bearing section 66 remote from the closing body 28 and on the other side on a bottom lid 70 supported in the valve housing 1, displaces the valve closing element 15, and via the stem 17 displaces the armature 10 as well, into the open position counter to the force of the compression spring 65, so that the closing body 28 is raised from the valve seat 27 and fluid can flow out of the inlet bore 23 via the valve seat 27 to the hollow chamber 24 and from there to the return line 31. In the bearing bore 67, between the end face 69 of the bearing section 66 and the bottom cover 70, a counterpart chamber 71 is formed, which communicates via a connecting line 72 with the hollow chamber 24. Protruding into the counterpart chamber 71 is a bolt 73 which has been screwed into the bottom cover 70 and has a slide section 74 of smaller diameter, on which a spring plate 75 rests in an axially movable manner on a step 76. The slide section 74 extends toward a blind bore 77 of the valve closing element 15 and receives a stop plate 78, which is likewise slidably supported and the movement of which on the slide section 74 is limited by a stop ring 79. The supplementary spring 56 is disposed inside the restoring spring 35, between the spring plate 75 and the stop plate 78. In the open position of the valve closing element 15, the stop plate 78 is spaced apart from the end face 69 of the bearing section 66 by a distance a which can be adjusted by rotating the bolt 73. The valve housing 1 is closed at the bottom by a plug 80. Now, if the magnetic coil 3 is excited, then the armature 10, via the stem 17, displaces the valve closing element 15 toward the valve seat 27. Now the valve closing element 15 can be moved only counter to the force of the restoring spring 35. After an amount of travel which is predetermined by the distance a, the end face 69 of the bearing section 66 meets the stop plate 78, before the closing body 28 meets the valve seat 27, and tenses the supplementary spring 56 until the closing body 28 is seated on the valve seat 27. If the excitation of the magnetic coil 3 is then interrupted, the forces of the restoring spring 35 and of the supplementary spring 56 act in common in the opening direction of the valve closing element 15 and thus assure rapid opening of the valve.

In the fourth exemplary embodiment of a magnetic valve shown in FIG. 4, identical elements having the same function are again assigned the same reference numerals as those of the foregoing embodiments, in particular those of FIG. 3. Deviating from the embodiment of FIG. 3, the bolt 73 in the exemplary embodiment of FIG. 4 is slidably supported in a slide bore 81 of the bottom cover 70 and with its end remote from the counterpart chamber 71 protrudes into a fluid chamber 82, which communicates by means of a fluid line 83 with the inlet bore 23. A stop angle element 84, the axially extending free ends of which extend toward the bottom cover 70, is joined to the end of the bolt 73 in the fluid chamber 82. A compression spring 85 surrounds the bolt 73 in the fluid chamber 82 and is suported on one end on the bottom cover 70 and on the other on the stop angle element 84. Now, if the magnetic coil 3 is excited, then the armature 10 displaces the closing body 28, via the stem 17, toward the valve seat 27 counter to the force of the restoring spring 35. During this movement, the end face 69 of the bearing section 66 either does not touch the stop ring 79 at all or touches it only shortly prior to the seating of the closing body 28 upon the valve seat 27, so that the closing movement is effected quickly. In a delayed manner, the bolt 73 is now displaced toward the bearing section 66 by the pressure buildup in the fluid chamber 82, so that the supplementary spring 56 is pre-stressed by the stop plate 78 that is resting on the end face 69. If the excitation of the magnetic coil 3 is interrupted, then the forces of the restoring spring 35 and the supplementary spring 56 now act in common in the opening direction of the valve closing element 15, so that the valve opens quickly.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A magnetic valve for fluid control comprising, a housing (1), a ferromagnetic core (2) in said housing adapted to receive a magnetic coil (3), said magnetic coil surrounding a portion of said core, an armature (10) arranged to actuate a valve closing element (15) having a terminal portion (28) in a valve closing direction, a valve seat body (22), an inlet (23) in said valve seat body, a valve seat (27) on said valve seat body adapted to receive said valve closing element, first spring means (35) arranged to force said valve closing element in an opening direction, pressure equalizing means (43) adjacent one end of said valve closing element and second spring means (56) associated with said pressure equalizing means and a collar (41) on said valve closing element, whereby upon excitation of said magnetic coil to close said valve closing element, pressure from said inlet exerts an increasing pressure on to said pressure equalizing means which exerts a force on said second spring means which exerts a force upon said valve closing element to urge said valve closing member in an opening direction in a delayed manner prior to deenergization of said magnetic coil, and subsequent to deenergization of said magnetic coil, said first and second spring exerts a force on said closing element to cause said closing element to quickly rise.

2. A magnetic valve as defined by claim 1, which comprises a spring housing which encompasses said second spring, said valve closing element has a remote end which extends through a bottom opening of said spring housing, said remote end of said valve closing element being provided with a collar within a chamber formed by said spring housing, said valve closing element further including a compensation bore which extends axially through said valve closing element and leads from said terminal portion of said valve closing element to said chamber formed by said spring housing whereby pressure in said chamber raises said spring housing to compress said second spring which then applies an opening force on said collar of said vlave closing element.

3. A magnetic valve as defined by claim 2, wherein said spring housing is slidably supported at its circumference with little play in a guide extension and is displaceable in a direction toward a housing stop, in accordance with the fluid pressure prevailing in said spring housing counter to the force of a biasing spring, and said second spring and an angle element are disposed in said spring housing, the angle element having a first bent end which is supported on a cover of said spring housing oriented toward said housing stop and extends radially outward and having a second bent end oriented toward said valve closing element, said bent end protrudes through a bottom opening of the spring housing and extends radially inward, gripping said collar of the valve closing element from behind and being spaced apart by an axial distance a from said collar only in the open position of the valve closing element, the said second spring being supported at one end on the first bent end of the angle element and on the other end on a bottom of the spring housing oriented toward said valve closing element.

4. A magnetic valve as defined by claim 2, in which said bottom opening of the spring housing tightly surrounds the protruding valve closing element and the spring housing is slidably supported on said closing element, a guide bore embodied in a cover of said spring housing, said valve closing element includes a guide end extending from said collar and extends into said guide bore, said guide end has a smaller cross section than the valve closing element in the vicinity of the bottom opening, said spring housing is displaceable toward a housing stop in accordance with fluid pressure prevailing in said spring housing, counter to the force of a biasing spring and said second spring and an angle element are disposed in said spring housing, said angle element having a first bent end which is supported on said cover of the spring housing oriented toward said housing stop and extend radially outward and has a second bent end, oriented toward said valve closing element, extending radially inward and spaced axially apart from a bottom of the spring housing and gripping the collar of the valve closing element from behind and being spaced apart by an axial distance a from the collar only in the opening position of the valve closing member, said second spring being supported at one end on the first bent end of the angle element and on the other end on the bottom of the spring housing oriented toward seat valve closing element.

5. A magnetic valve as defined by claim 1, in which said valve closing element has a bearing section remote from the valve seat and slidably guided in a bearing bore, an end face of said bearing section is engaged by said first spring, which surrounds said second spring, said first spring and said second spring being supported on one end of a spring plate and on the other end on a stop plate which is oriented toward the end face of the bearing section and is slidably supported on a bolt, and said stop plate is spaced apart axially by a distance a from the end face of the bearing section only in the open position of the valve closing element.

6. A magnetic valve as defined by claim 5, in which said spring plate of the second spring is displaceably supported in the direction toward the end face of the bearing section of the valve closing element.

7. A magnetic valve as defined by claim 6, wherein said bolt is axially displaceably disposed in the valve housing in that for displacing the spring plate of said second spring.

8. A magnetic valve as defined by claim 7, in which said bolt is screw-threaded into the valve housing.

9. A magnetic valve as defined by claim 7, in which an end of said bolt remote from said stop plate protrudes into a fluid chamber which communicates with a fluid upstream of said valve seat by means of which a pressure force of fluid on said bolt, said bolt is displaceable toward the valve closing element only in the closing position of the valve closing element.

* * * * *